United States Patent
Su et al.

(10) Patent No.: US 9,863,824 B1
(45) Date of Patent: Jan. 9, 2018

(54) RESISTANCE-VOLTAGE TRANSFORMATION SYSTEM FOR SENSORS IN DYNAMIC STRAIN MEASUREMENT AND STRUCTURAL HEALTH MONITORING

(71) Applicant: THE HONG KONG POLYTECHNIC UNIVERSITY, Hong Kong (HK)

(72) Inventors: Zhongqing Su, Hong Kong (HK); Limin Zhou, Hong Kong (HK); Lei Qiu, Hong Kong (HK); Hao Xu, Hong Kong (HK); Zhihui Zeng, Hong Kong (HK); Menglong Liu, Hong Kong (HK)

(73) Assignee: The Hong Kong Polytechnic University, Hong Kong (HK)

( * ) Notice: Subject to any disclaimer, the term of this patent is extended or adjusted under 35 U.S.C. 154(b) by 0 days.

(21) Appl. No.: 15/269,933

(22) Filed: Sep. 19, 2016

(51) Int. Cl.
*G01L 1/00* (2006.01)
*G01L 1/18* (2006.01)
*G01M 5/00* (2006.01)

(52) U.S. Cl.
CPC ............. *G01L 1/18* (2013.01); *G01M 5/0041* (2013.01)

(58) Field of Classification Search
CPC ................................ G01L 1/18; G01M 5/0041
USPC .................................................... 73/774, 777
See application file for complete search history.

(56) References Cited

U.S. PATENT DOCUMENTS

| | | | | |
|---|---|---|---|---|
| 8,618,934 | B2* | 12/2013 | Belov | G01M 5/00 250/310 |
| 9,488,545 | B2* | 11/2016 | Rice | G01M 5/0066 |
| 2011/0142091 | A1* | 6/2011 | Wardle | B82Y 15/00 374/45 |
| 2013/0130734 | A1* | 5/2013 | Rice | G01M 5/0066 455/517 |
| 2013/0333922 | A1* | 12/2013 | Kai | G06F 3/045 174/250 |

* cited by examiner

*Primary Examiner* — Max Noori
(74) *Attorney, Agent, or Firm* — Spruson & Ferguson (HK)

(57) ABSTRACT

A resistance-voltage (R-V) transformation system used in dynamic strain measurement for a structure is provided. The system has single-channel (SC) circuit units each for producing a voltage corresponding to a resistance of a sensing element of a structural-strain sensing network. Each SC circuit unit has a R-V transformation module for converting the resistance into the voltage, a band-pass filter module for filtering the R-V transformation module output after a direct-current bias therein is removed, and a high-gain amplification module for amplifying the filter output. The band-pass filter module is configured such that an unwanted low-frequency component induced by resistance drift of the sensing element is removed while allowing a guided-wave signal component to pass through. Particularly advantageous for the sensing network using nanocomposite sensing elements, the R-V transformation system is useful for a wide range of sensor resistance values, mitigating adverse effects of resistance drift, and enabling simplicity in wiring.

16 Claims, 8 Drawing Sheets

RESISTANCE-VOLTAGE TRANSFORMATION SYSTEM FOR SENSORS IN DYNAMIC STRAIN MEASUREMENT AND STRUCTURAL HEALTH MONITORING

FIELD OF THE INVENTION

The present invention generally relates to sensing strain signals in structural health monitoring. In particular, the present invention relates to a resistance-voltage transformation system for converting resistances of sensing elements into voltage values in sensing the strain signals.

BACKGROUND

Structural health monitoring (SHM) based on the propagation of guided waves has been widely applied in engineering practice to conduct on-line identification of impact or micro-scale structural damage such as fatigue cracks. To capture the guided waves, conventional metal-foil strain gauges are rarely used because of their limitation in sensing strain signals under ultra-high frequencies (for example beyond 100 kHz). Piezoelectric sensors such as those made of lead titanate zirconate (PZT), on the other hand, are most-widely used due to their high sensitivity in measuring ultrasonic strains having very low magnitudes. However, some obvious shortcomings are associated with PZT-type sensors. For example, their rigid material properties are possible to cause variations in the material and geometric properties of the host structures, and PZT sensors might be easily damaged because of their fragility. Another existing problem is that in order to obtain impact/damage information as precisely as possible, the distribution of sensors needs to be arranged in an extremely dense manner. Dense distribution of the sensors is difficult to be implemented in applications because of shortage of existing practical ways for sensor attachment, circuit construction and wire arrangement.

Flexible and lightweight nanocomposites fabricated by blending nanofillers with a polymer have been intensively investigated in recent years in capturing dynamic strain signals and in the application of SHM. For example, a sensing network comprising a plurality of nanocomposite sensing elements for SHM has been disclosed in U.S. patent application Ser. No. 15/235,113 filed on Aug. 12, 2016, the disclosure of which is incorporated by reference herein. Compared with conventional PZT sensors, a nanocomposite can be directly coated on a structure's surface to generate a sensing network with a freely-designed distribution geometry at a very high density. Since the essence of the strain sensing capacity of the nanocomposite resides on its piezoresistive nature, resistance-voltage (R-V) transformation systems are of necessity to be included to generate voltage signals based on the resistance variation of the sensors. The voltage signals are captured and further interpreted by commonly used electrical devices. For each element of the nanocomposite sensing network, an independent R-V unit (circuit) is needed, which implies that a large number of units should be integrated in a SHM system involving dense sensing networks.

Although the realization of a R-V transformation system for a nanocomposite sensing network faces many practical challenges, such challenges have not been widely addressed in the art. There is a need in the art for a design of R-V transformation system for the nanocomposite sensing network. Such design may also benefit R-V transformation for other non-nanocomposite sensing networks facing similar problems.

SUMMARY OF THE INVENTION

An aspect of the present invention is to provide a R-V transformation system useful for a wide range of sensor resistance values, mitigating adverse effects of resistance drift, and enabling simplicity in wiring.

The R-V transformation system comprises one or more single-channel (SC) circuit units. An individual SC circuit unit is used for producing a voltage corresponding to a resistance of a sensing element of a structural-strain sensing network. The structural-strain sensing network is used for dynamic measurement of strain on a structure. The individual SC circuit unit comprises a R-V transformation module, a band-pass filter module and a high-gain amplification module.

The R-V transformation module includes a R-V transformation circuit, a high-pass filter and a wideband signal amplifier. The R-V transformation circuit includes three terminals used for connecting the R-V transformation circuit to a first resistor and a second resistor, where the second resistor is the sensing element. One of the three terminals is a common node configured to connect to both the first and second resistors such that an output voltage of the R-V transformation circuit is obtained at the common node. In one option, the first resistor is a variable resistor having a resistance tunable for matching with the resistance of the sensing element. In another option, the first resistor is selected to have a fixed resistance value. Yet in another option, the first resistor is another sensing element that is located at the same position of the first sensing element, but on the opposite side of the structure.

Preferably, the first signal is obtained from the R-V transformation circuit output voltage by at least removing a direct-current (DC) bias from the R-V transformation circuit output voltage.

The high-pass filter is used for filtering the R-V transformation circuit output voltage so as to at least remove the DC bias from the R-V transformation circuit output, thereby generating a second signal as an output of the high-pass filter. The wideband signal amplifier is used for generating the first signal by amplifying the second signal without substantially loading the high-pass filter. In one option, the wideband signal amplifier is a non-inverting amplifier.

Preferably, the individual SC circuit unit further comprises a band-pass filter module which is used for band-pass filtering a first signal obtained from the output voltage of R-V transformation module to thereby generate a bandlimited signal for the dynamic strain measurement. The band-pass filter module is configured such that an unwanted low-frequency voltage component induced by resistance drift of the sensing element is substantially removed from the first signal while allowing a guided-wave signal component in the first signal to substantially pass through. Preferably, the band-pass filter module is further configured to substantially suppress a high-frequency noise located outside a frequency band of the guided-wave signal component.

The band-pass filter module may comprise one or more high-pass filters and one or more low-pass filters. All of the one or more high-pass filters and the one or more low-pass filters are cascaded in series.

Preferably, the individual SC circuit unit further comprises a high-gain amplification module for amplifying the bandlimited signal. Thereby, the guided-wave signal component in the bandlimited signal is amplified for the dynamic strain measurement. The high-gain amplification module may comprise a plurality of amplifiers cascaded in series.

The sensing element of the structural-strain sensing network may be a nanocomposite sensing element or a piezoresistive sensor.

Other aspects of the present invention are disclosed as illustrated by the embodiments hereinafter.

DETAILED DESCRIPTION

As used herein, "a structure" means a combination of members connected together in such a way to serve a useful purpose. The useful purpose may be related to civil engineering and mechanical engineering, to name a few. Examples of the structure related to the domain of civil engineering include a building, a part thereof such as a wall, a dam and a bridge. In the domain of mechanical engineering, examples of the structure include a car, a train, an aircraft, a machine, a water pipe, an oil pipe, etc.

The present invention is developed based on the following observations.

In most engineering applications in SHM, a WB is typically used in performing R-V transformation for conventional resistive strain sensors such as metal-foil strain gauges. In existing studies related to the use of nanocomposite sensors to measure strain signals, the WB has also been widely adopted, which seems as a natural option. However, some unique features of the nanocomposite sensors present huge difficulty in the effective application of WBs.

Figure 1:
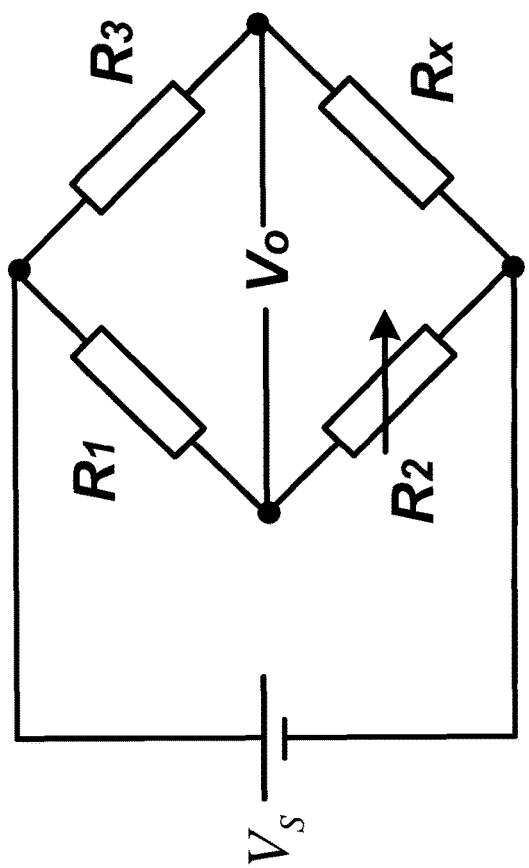
FIG. 1 depicts a representative circuit of a Wheatstone bridge (WB).

For illustration, a typical WB circuit is plotted in FIG. 1, where: $V_S$ and $V_o$ denote the power source voltage and the output voltage, respectively; $R_x$ is the sensor resistance under measurement; $R_1$, $R_2$ and $R_3$ are three component resistors, in which $R_2$ is assumed to be adjustable to achieve bridge balance. The output voltage $V_o$ is given by $$V_o = V_S \left( \frac{R_x}{R_3 + R_x} - \frac{R_2}{R_1 + R_2} \right). \quad (1)$$

The sensitivity of $V_o$ to $R_x$ can be obtained by taking a derivative with respect to $R_x$, thereby obtaining $$\frac{dV_o}{dR_x} = \frac{V_S R_3}{(R_3 + R_x)^2}. \quad (2)$$

From EQN. (2), it is apparent that the sensitivity increases with increasing $V_S$ and/or decreasing $R_x$. With respect to the component resistors, one can easily show that optimal sensitivity (i.e. maximal sensitivity) can be obtained when $$R_1 = R_2 = R_3 = R_x. \quad (3)$$

For commercial resistive strain sensors, sensor resistances can be strictly controlled. For example, the most widely used metal-foil strain gauges are with two different standard resistances, i.e. 120Ω and 350Ω. With a fixed and stable sensor resistance, bridge balance and optimal sensitivity can be easily achieved by keeping all the components' resistance values equal to the sensor resistance, as indicated in EQN. (3). For nanocomposite sensors, however, optimal sensitivity is extremely difficult to obtain because of the following factors.

Wide Range of Resistance Values:

There are large differences in resistance values among nanocomposite sensors due to different material combinations and different dispersion states of nanofillers in the polymer matrix. Both the types of nanofiller and polymer can be diverse. For instance, the nanofiller can be carbon nanotube (CNT), carbon black (CB), graphene or their combinations. One type of nanofiller can have a variety of grades. For example, there are a large number of grades of CB such as N110, N220, etc. On the other hand, diverse types of the polymer matrix can also be selected, for example, epoxy, polyvinylidene fluoride (PVDF), etc. Different combinations of materials lead to a wide possible range of sensor resistance values, from several ohms to several mega-ohms. Moreover, even under a given combination of nanofillers and polymer, different dispersion states (which are highly difficult to control) of the nanofillers in different sensors lead to quite different resistance values. Under such circumstance, it is impractical to design a standard circuit based on WBs for so many nanocomposite sensors. In practical applications, it is necessary to adjust all the component resistors according to the actual value of the sensor resistance to satisfy EQN. (3) for achieving optimal sensitivity. For a single sensor, such adjustment may be feasible. However, for a network containing a large number of sensing elements, where each element needs an independent R-V unit, an integrated circuit probably has the form shown in FIG. 2, from which it can be imagined that very tedious work is involved in resistance adjustment. If the number of sensing elements is very high, for example several hundreds, resistance adjustment tends to be impossible.

Drift in Resistance:

Even assuming that the adjustment of resistance can be precisely conducted according to the resistance of each sensing element, to obtain optimal sensitivity is still difficult, or even impossible, because the resistance of nanocomposite is highly unstable. Different from a conventional metal-foil strain gauge, the strain sensitivity of nanofiller/polymer nanocomposite resides on the tunneling effect between adjacent nanoparticles. The tunnel resistance, directly linked with the distance between adjacent particles, is very sensitive to environmental factors such as temperature. In a practical application, continuous resistance drift of nanocomposite is obvious and unavoidable, and a normal range of drift can exceed ±5% of the initially measured sensor resistance. Thus, the effectiveness of resistance adjustment may easily vanish during the actual process of strain measurement. Moreover, for most commercial electrical devices, the above-mentioned range of resistance drift (i.e. exceeding ±5%) can even not be tolerated.

Figure 2:
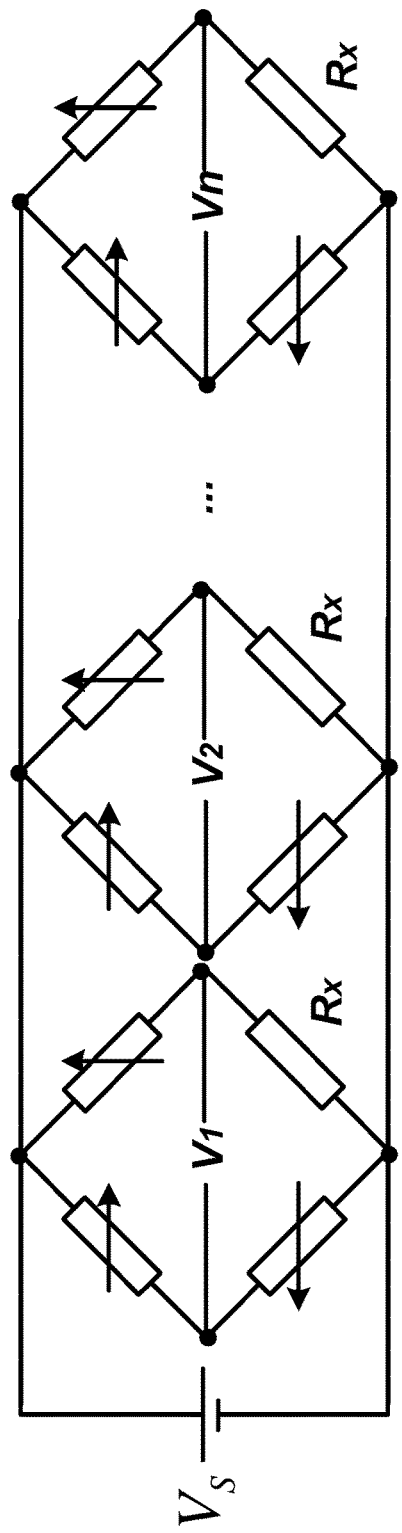
FIG. 2 depicts, as an example for illustration, an integrated multi-channel R-V transformation system comprising a number of WBs.

Complexity in Wiring:

By observing FIG. 2, it is clear that for a dense sensing network, the integrated circuit involves a large number of outputs, the number of which is as twice as the number of the sensing elements, that is, 2n outputs for n elements. Such a large number involves highly complex work in wire arrangement. Even though there are some advanced manufacturing techniques, the complex wire distribution is possible to cause practical issues that limit the density of sensing elements.

An aspect of the present invention is to provide a R-V transformation system useful for a wide range of sensor resistance values, mitigating adverse effects of resistance drift, and enabling simplicity in wiring.

Although the present invention is advantageously useful to a structural-strain sensing network comprising a plurality of nanocomposite sensing elements, the present invention is not limited only to such sensing network having only nanocomposite sensing elements. The present invention is also useful to non-nanocomposite sensing network facing one or more issues similar to any of the above-mentioned three factors. For example, the present invention is also useful to a sensing network composed of piezoresistive sensors showing diverse resistance values and exhibiting resistance drifting. Hereinafter, the present invention is described for a structural-strain sensing network comprising nanocomposite sensing elements. Based on the teachings presented hereinafter, those skilled in the art are easy to apply the present invention to other sensing networks that use non-nanocomposite sensing elements.

The R-V transformation system as disclosed herein comprises one or more SC circuit units. An individual SC circuit unit is used for producing a voltage corresponding to a resistance of a nanocomposite sensing element of a structural-strain sensing network. The structural-strain sensing network, comprising plural nanocomposite sensing elements, is used for dynamic measurement of strain on a structure by detecting a guided-wave signal received at each nanocomposite sensing element.

SC Circuit Unit

Before the SC circuit unit is detailed, several considerations are first made.

1. Since in the guided-wave-based SHM, identification of an impact or a structural damage is detected by merely observing the appearance of particular signal waveshapes and finding out the arrival times of such waveshapes, the designed SC circuit unit is not required to measure exact values of strains.
2. Component resistor is needed. In addition, the component resistor needs to be adjustable to adapt to a wide range of resistance values of nanocomposite sensors in order to achieve satisfactory sensitivity.
3. The resistance drift of the nanocomposite sensor is unavoidable, because of the nature of nanocomposites, e.g., the tunneling effect. Thus, optimal sensitivity cannot be guaranteed, but can only be reached as close to as possible. Moreover, the sensor resistance is considered to drift at a very low speed compared to the variation of resistance due to the guided wave. In general, the induced voltage by the guided wave normally changes at a frequency higher than 100 kHz, but the resistance drift only causes a time-varying fluctuation in resistance at a much lower frequency, e.g., less than ~1 Hz.
4. Considering the instability of sensor resistance and the weakness (namely, low amplitude) of the guided wave signal, it is desirable that the designed SC circuit unit conducts wideband signal filtering and provides high-gain amplification.

Figure 3:
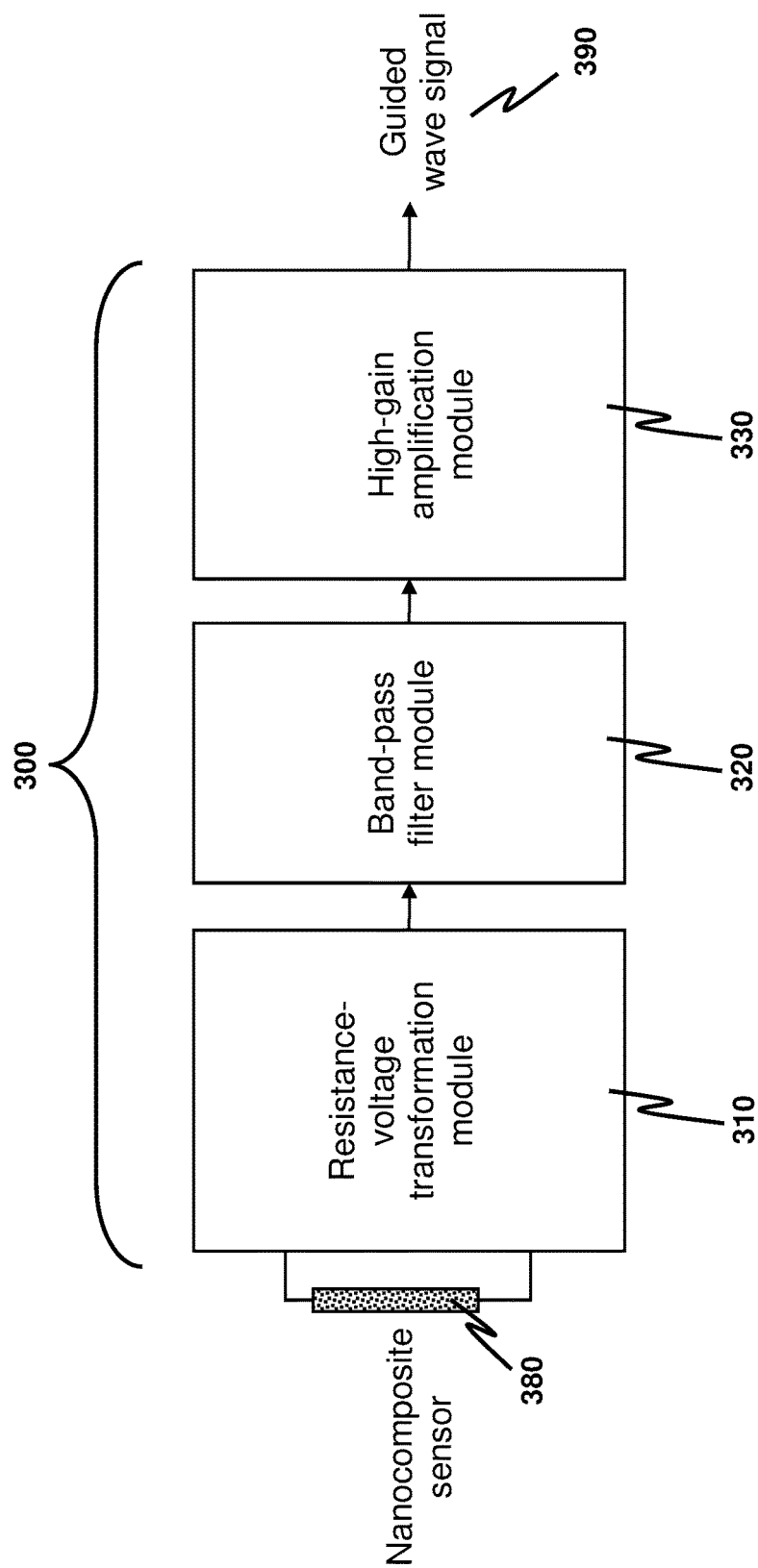
FIG. 3 exemplarily depicts a schematic diagram of a SC circuit unit used in the construction of a (multi-channel) R-V transformation system for guided-wave-based SHM.

The SC circuit unit is exemplarily illustrated with the aid of FIG. 3, which depicts a schematic diagram of an exemplary SC circuit unit. Based on the above-mentioned consideration, an SC circuit unit 300 includes a R-V transformation module 310, a band-pass filter module 320 and a high-gain amplification module 330. The latter two modules are used to perform signal conditioning.

The high-frequency small-magnitude resistance change of a nanocomposite sensing element 380 is transformed to a voltage variation by the R-V transformation module 310. After that, the voltage signal produced by the R-V transformation module 310 is de-noised by the band-pass filter module 320 to substantially suppress the voltage induced by resistance drift and high-frequency noise. The aforesaid high-frequency noise means noise and interference at a frequency outside a frequency band of the guided-wave signal component in the output of the R-V transformation module 310. Preferably and desirably, the bandlimited output signal of the band-pass filter module 320 is amplified by the high-gain amplification module 330 to produce a guided wave signal 390 for the dynamic strain measurement.

Although the SC circuit unit 300 depicted in FIG. 3 includes the high-gain amplification module 330, it is possible that in some practical implementations, the high-gain amplification module 330 is absorbed in the band-pass filter module 320.

Figure 4:
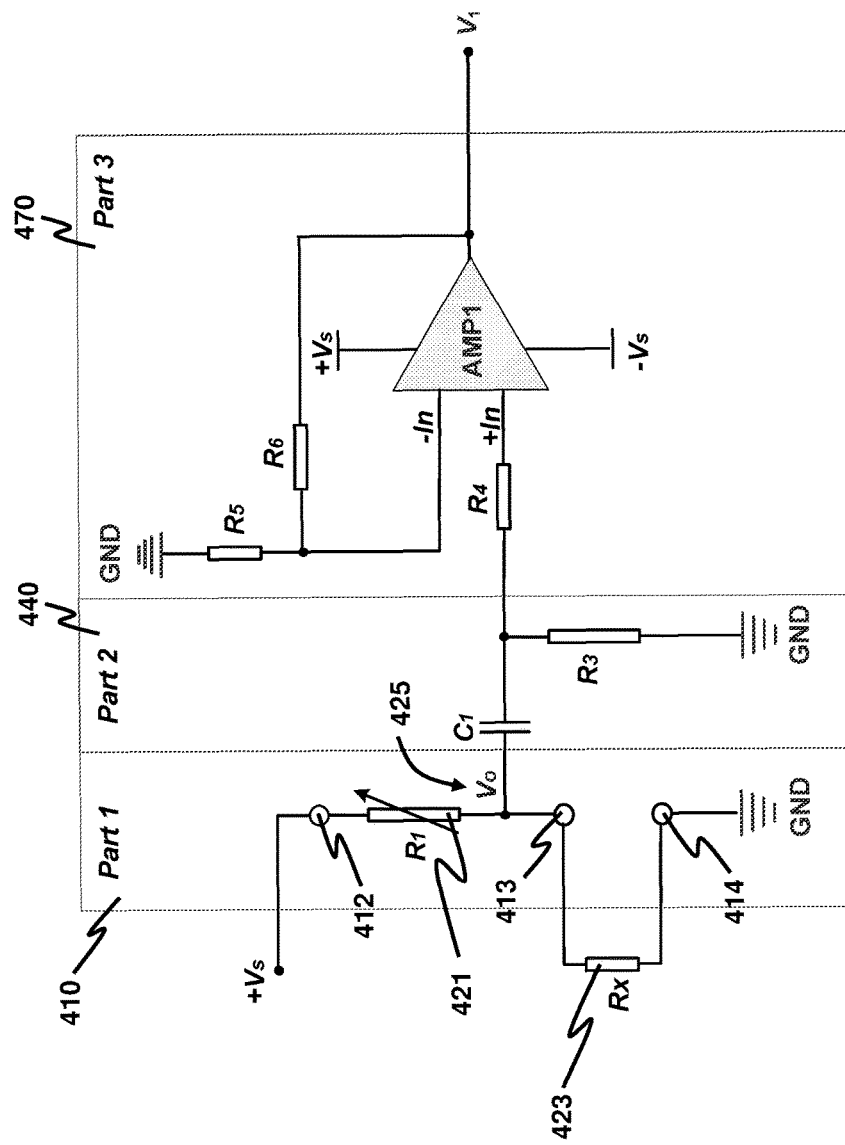
FIG. 4 depicts a R-V transformation module of the SC circuit unit, designed for a single nanocomposite sensor in accordance with one embodiment of the present invention.

An exemplary design of the R-V transformation module 310 is given in FIG. 4. The R-V transformation module 310 comprises three parts cascaded in series. Part 1 is a R-V transformation circuit 410. Part 2 is a high-pass filter 440. Part 3 is a wideband signal amplifier 470. The R-V transformation circuit 410 is used for performing R-V transformation. The high-pass filter 440 is mainly used for removing a DC bias in an output voltage of the R-V transformation circuit 410. Optionally, the high-pass filter 440 may be replaced by a DC-blocking filter. The wideband signal amplifier 470 functions for impedance isolation and primary amplification.

The R-V transformation circuit 410 includes three terminals 412, 413, 414 used for connecting the R-V transformation circuit 410 to a first resistor 421 and a second resistor 423. In particular, the second resistor 423 is the nanocomposite sensing element 380, whose resistance is to be measured. One of the three terminals 412, 413, 414 is a common node configured to connect to both the first resistor 421 and the second resistor 423. It is apparent that the common node is the terminal 413. An output voltage 425 of the R-V transformation circuit 410 is obtained at the common node 413.

Figure 5:
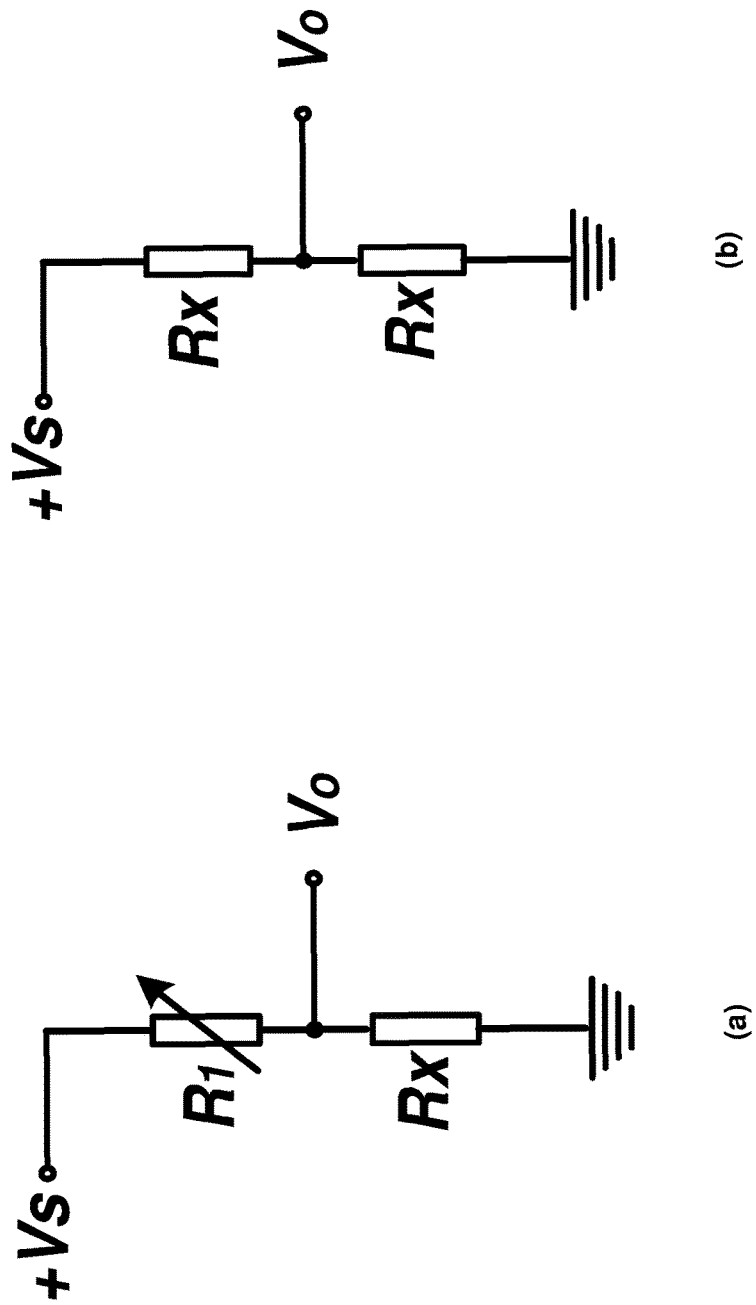
FIG. 5 depicts a R-V transformation circuit of the R-V module shown in FIG. 4 under (a) a half usage and (b) a full usage, respectively involving one and two nanocomposite sensors.

Further details of the R-V transformation circuit 410 are highlighted in FIG. 5. FIGS. 5(a) and 5(b) are two embodiments of the R-V transformation circuit 410. Because of the similarity between FIGS. 5(a) and 5(b), the former is focused on for further illustrating the R-V transformation circuit 410. Note that in the circuit depicted in FIG. 5(*a*), the first resistor 421 is selected to be a variable resistor $R_1$ having a resistance tunable for matching with the resistance of the nanocomposite sensing element 380.

As shown in FIG. 5(*a*), the resistor $R_1$ and the nanocomposite sensing element $R_x$ are connected in series. It can be easily realized that FIG. 5 can be seen as a simplification to FIG. 1 by removing $R_1$ and $R_2$ of the WB and by connecting one end of the wires to the ground. Such simplification is explained as follows.

First, the sensitivity of $V_o$ (the R-V transformation circuit 410 output voltage) is given by $$\frac{dV_o}{dR_x} = \frac{V_S R_1}{(R_1 + R_x)^2}. \tag{4}$$

Optimal sensitivity is achieved when $$R_1 = R_x. \tag{5}$$

The inventors have observed that EQNS. (2) and (4) possess similar forms, and thus the sensitivity of the circuit of FIG. 5(*a*) is the same as that of FIG. 1. However, it is required to consider that all component resistors need to be adjusted in practice according to different resistance values of nanocomposite sensing elements. In comparison with EQN. (3), EQN. (5) is much easier to be satisfied in practical applications in that only one resistor needs adjustment. It may be concerned that usages of WB can be more flexible, including half bridge and full bridge usages with increased sensitivity. (A half bridge means two sensors are installed, e.g. $R_3$ and $R_x$. For a full bridge, four sensors are installed, i.e. $R_1$, $R_2$ and $R_3$ and $R_x$. The sensitivity of the full bridge is the highest, followed by the half bridge) However, such two usages are hardly adopted in guided wave measurement. On the other hand, a nearly "full" usage can be realized according to FIG. 5(*b*), in which two nanocomposite sensing elements attached to opposite sides of the structure are used to capture strain signals that vary inversely. For a plate structure for example, the opposite sides here means its front and back sides. If the front side of the plate undergoes tension, then the back side undergoes compression. Thus, the strains measured by the two sensors have opposite signs. For example, if one sensor measures a strain of 1%, the other has a measurement of −1%. If the in-plane region of the plate can be represented by an x-y coordinate, the two sensors have the same x and y values, but they have different z values along the thickness of the plate. Since they are arranged oppositely, it is possible that they may not belong to the same sensing network, but may exist in two different sensing networks. One network is arranged on the front side, and another is on the back side. Hence, the second resistor 423 is one nanocomposite sensing element and the first resistor 421 is another nanocomposite sensing element, where the aforesaid one and another nanocomposite sensing elements are located at the same position but on opposite sides of the structure.

An even further simplification can be made by using a fixed $R_1$ (i.e. the first resistor 421 having a fixed resistance value) if the overall resistance range of the nanocomposite sensing element is narrow enough (for example, under a standard derivation less than 50%) and a certain degree of difference between $R_1$ and $R_x$ can be tolerated. The advantage of using a resistor of a fixed resistance is that no resistor needs to be adjusted, which is very convenient for applications. The possible shortcoming is that the sensitivity of the R-V transformation circuit 410, as expressed by EQN. (4), has to be limited to some extent.

The two circuits shown in FIG. 5 prevent a large amount of tedious work in circuit construction and resistor adjustment, without any sacrifice of sensitivity compared with the WB-based circuit. It may be argued that the R-V transformation circuit 410 could achieve other merits such as immunity to an unstable source voltage, but it should be noticed that such immunity can only be obtained in a highly balanced bridge, and as mentioned above, the bridge can hardly be balanced because of resistance drift of the nanocomposite sensing element. Another point is that at present, a highly-stable source voltage can be easily provided for $V_s$. Therefore, simply removing the two component resistors, i.e. $R_1$ and $R_2$ shown in FIG. 1, is considered to be reasonable. Furthermore, the grounded wires in FIGS. 4 and 5 are of vital importance in integrating a large number of SC circuit units to form the R-V transformation system (to be elaborated later).

The function of the high-pass filter 440 is explained as follows. Since the R-V transformation circuit 410 output voltage 425 contains a DC voltage bias, the high-pass filter 440 is usable to eliminate the DC voltage bias. FIG. 4 shows a passive first-order high-pass filter as an example for realizing the high-pass filter 440, but the present invention is not limited to this realization. The high-pass filter 440 may be realized by any technique known in the art, provided that the high-pass filter 440 is configured to at least remove the DC bias from the R-V transformation circuit 410 output voltage 425. In the first-order high-pass filter of FIG. 4, the high-pass cut-off frequency is expressed as $$f_{c1} = \frac{1}{2\pi R_3 C_1}. \tag{6}$$

Note that it is not adequate to merely use the first-order high-pass filter to suppress the low-frequency noise of the guided-wave signal and to eliminate the resistance-drifting-induced voltage because the roll-off of the first-order high-pass filter is not adequately steep. It is the reason that the band-pass filter module 320 should be particularly designed to substantially suppressing the voltage fluctuation due to resistance drift.

As one design shown in FIG. 4, the wideband signal amplifier 470 is designed to be a non-inverting amplifier, which comprises an integrated amplifier of high frequency, wideband and ultra-low noise. The use of the high-frequency, wideband, ultra low-noise amplifier is very important because of the following two reasons. First, the amplitude of $V_o$ is very low and it needs to be amplified by a high-gain amplifier, so that the noise should be controlled to be low. Second, $V_o$ contains guided-wave signal components, which are high-frequency components, so that the bandwidth of the amplifier should be wide enough.

The input impedance of the non-inverting amplifier is very high and the output impedance is low. Thus, the non-inverting amplifier can be used to isolate the R-V transformation circuit 410 and the high-pass filter 440 from subsequent modules. Regarding the function of amplification, the transfer function of the non-inverting amplifier is expressed as $$V_1 = V_o \left(1 + \frac{R_6}{R_5}\right) \tag{7}$$

and the relationship between $R_4$, $R_5$ and $R_6$ in FIG. 4 is given by $$R_4 = \frac{R_5 R_6}{R_5 + R_6}. \tag{8}$$

Refer to FIG. 3. The band-pass filter module 320 is used for band-pass filtering an input signal to generate a bandlimited signal for the dynamic strain measurement. The input signal is the output signal of the R-V transformation module 310, and is in general a signal obtained from the R-V transformation circuit 410 output voltage 425. Furthermore, the band-pass filter module 320 is configured such that an unwanted low-frequency voltage component induced by resistance drift of the nanocomposite sensing element 380 is substantially removed from the input signal while allowing a guided-wave signal component in the input signal to substantially pass through.

In one embodiment, the band-pass filter module 320 comprises one or more high-pass filters connected in series with one or more low-pass filters.

Figure 6:
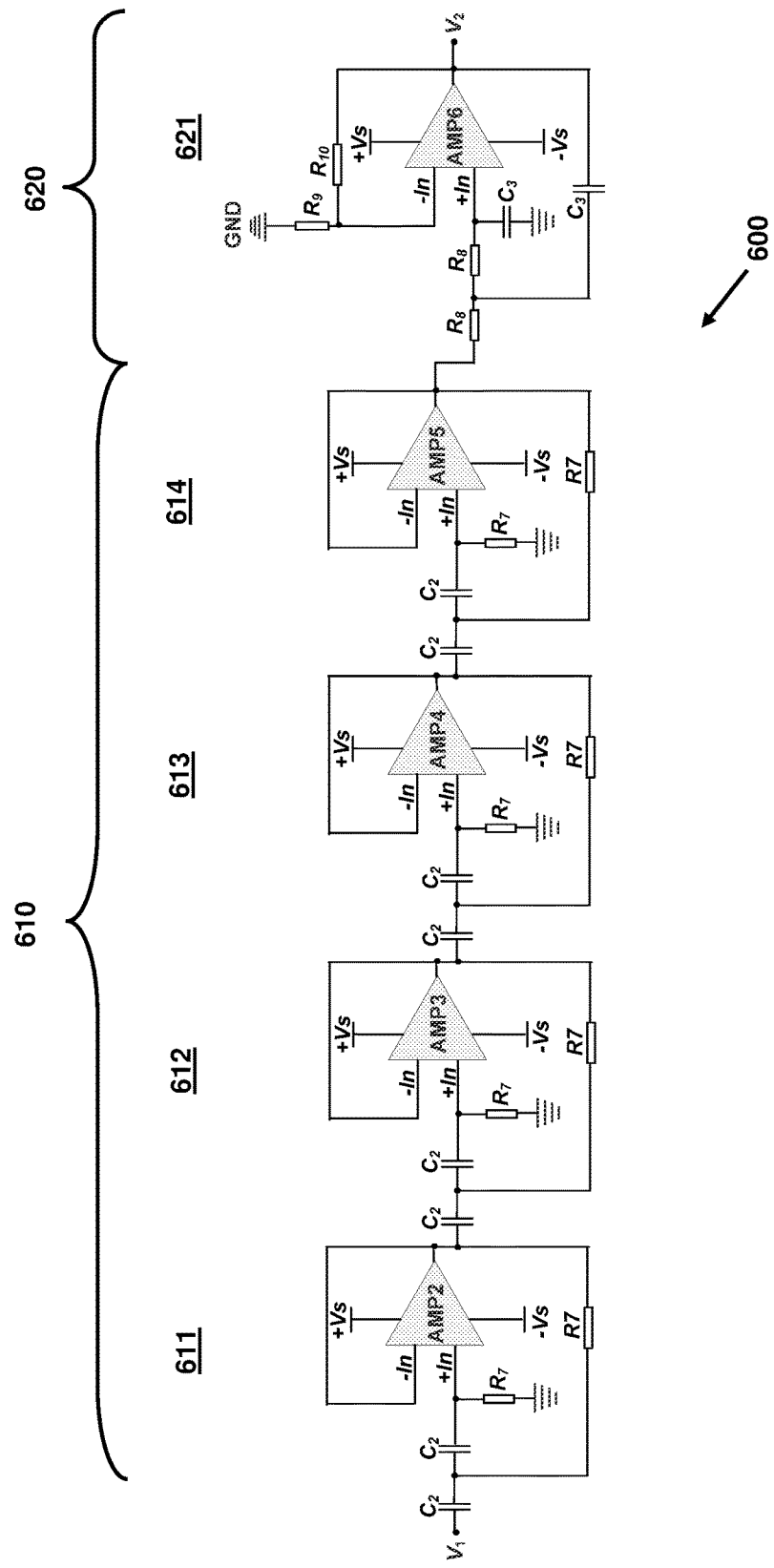
FIG. 6 depicts an exemplary circuit design for a band-pass filter module of the SC circuit unit.

One realization of the band-pass filter module 320 is depicted in FIG. 6. In FIG. 6, a band-pass filter module 600 is formed by having a high-pass filter 610 realized as four second-order high-pass active filters 611-614 connected in series followed by a low-pass filter 620 realized as one second-order low-pass active filter 621. The high pass cut-off frequency of each of the four second-order high-pass active filters 611-614 is $$f_{c2} = \frac{1}{2\pi R_7 C_2} \tag{9}$$

and the low pass cut-off frequency of the second-order low-pass active filter 621 is expressed as $$f_{c3} = \frac{1}{2\pi R_8 C_3}. \tag{10}$$

The gain of the high-pass filter 610 is designed to be 1 and the gain of the low-pass filter 620 is determined by the ratio between $R_{10}$ and $R_9$. Thus, the total gain of the band-pass filter module 600 is expressed as $$V_2 = v_1\left(1 + \frac{R_{10}}{R_9}\right). \tag{11}$$

It can be shown that by using the high-pass filter 610 with four second-order high-pass active filters 611-614, an equivalent eighth-order filter of 80 dB per decade in roll-off can be obtained. Thus, the induced voltage due to resistance drifting can be largely reduced.

In one practical realization, the band-pass filter module 320 is configured to have a lower −3 dB cut-off frequency of 15 kHz and an upper −3 dB cut-off frequency of 500 kHz.

Figure 7:
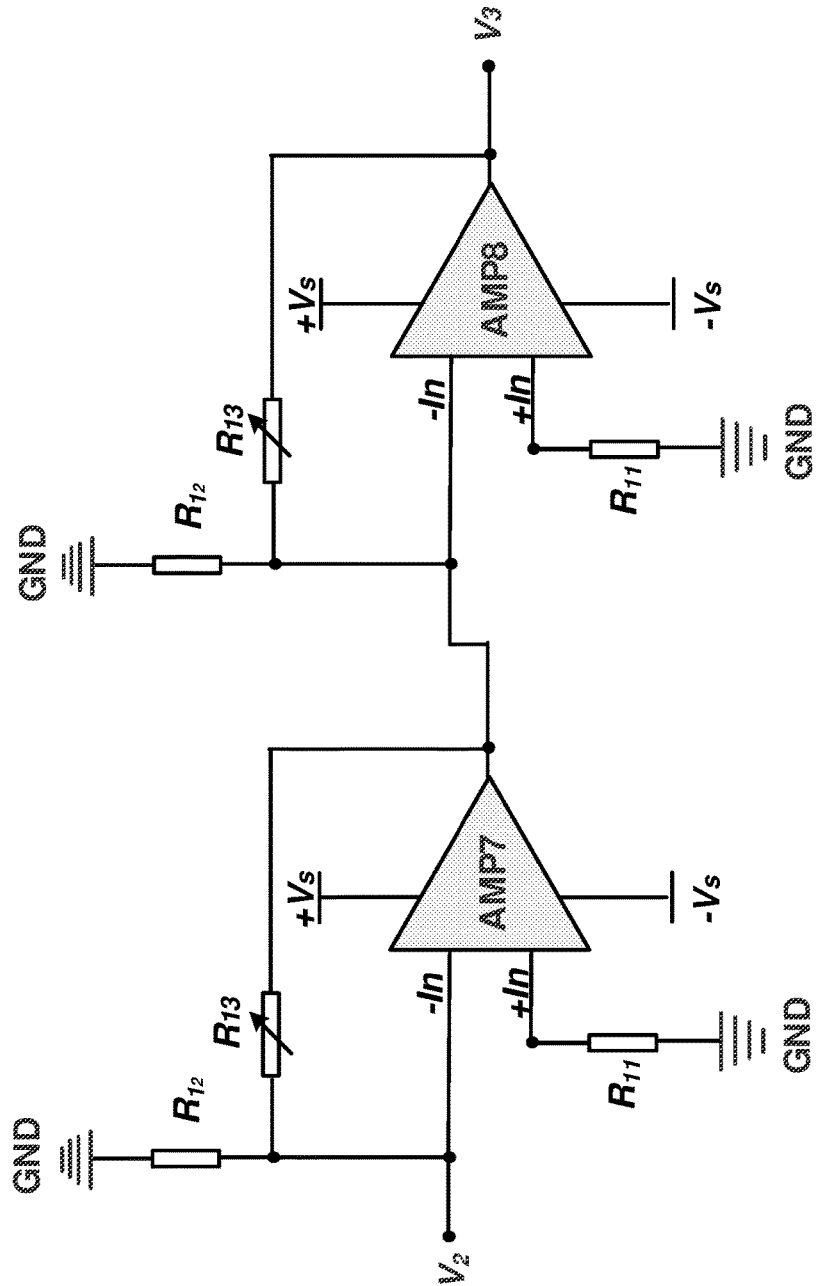
FIG. 7 depicts an exemplary circuit design of a high-gain amplification module of the SC circuit unit.

In one embodiment, the high-gain amplification module 330 comprises cascading plural amplifiers cascaded in series. One such realization of the high-gain amplification module 330 has two inverting amplifiers as shown in FIG. 7. The negative feedback resistance $R_{13}$ is set to be a sliding rheostat so that the gain can be adjusted according to the amplitude of actual guided-wave signal. The total gain provided by the high-gain amplification module 330 is expressed as $$V_3 = V_2\left(\frac{R_{13}}{R_{12}}\right)^2. \tag{12}$$

Considering that $R_{13}$ is much larger than $R_{12}$, $R_{11}$ is preferably set to be equal with $R_{12}$.

Integration of SC Circuit Units to Form the R-V Transformation System

Figure 8:
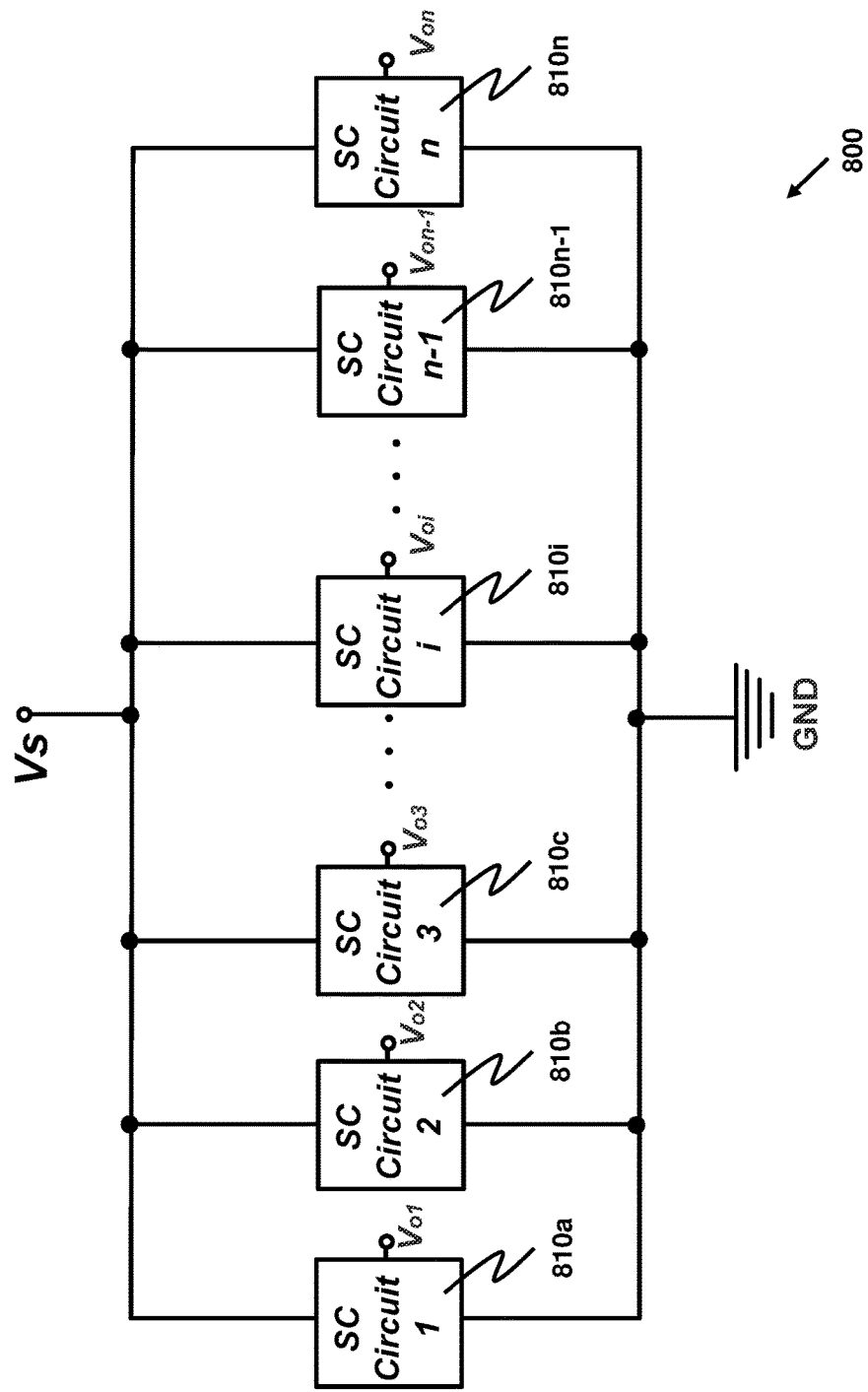
FIG. 8 depicts a schematic diagram of an integrated (multi-channel) R-V transformation system comprising a plurality of SC circuit units each for an individual nanocomposite sensing element of a structural-strain sensing network.

For a structural-strain sensing network having a large number of sensing elements, a large number of SC circuit units are required to be integrated to form the R-V transformation system. An exemplary schematic diagram of such system is shown in FIG. 8, showing how individual SC circuit units are integrated. A R-V transformation system 800 comprises a plurality of SC circuit units 810a-n cascaded in parallel, where each of the SC circuit units 810a-n is realized according to any of the embodiments disclosed above. Advantageously, the system 800 is supported by a single power source. It can be imagined that because the circuits of FIG. 5 are simpler than the WB shown in FIG. 1, the system 800 is much simpler than a multi-channel system constructed based on a number of WBs (FIG. 2). More importantly, it can be observed from FIG. 8 that because half of the electrodes of the sensors are grounded, the number of outputs is n+1 for n sensing elements. It means that the number of outputs is basically half of that based on WBs. Thus, a considerable degree of simplification of wire arrangement can be achieved. Under a high-density condition of a sensing network, such an advantage is crucial for improving sensing efficiency and accuracy.

Advantages

The R-V transformation system as disclosed herein has a simplified circuit design. The R-V transformation module 310 in each SC circuit unit only uses at most one adjustable (or fixed) resistor, leading to much-simplified resistor adjustment, particularly advantageous when there are a large number of sensing elements in the sensing network.

In addition, the wiring arrangement of the R-V transformation system is made simple. The number of outputs of the R-V transformation system is small, approximately equal to the number of sensing elements.

Furthermore, the noise filtering capability of the R-V transformation system is high. The band-pass filter module 320 is able to substantially suppress induced voltage generated by a sensing element due to resistance drifting.

Remark

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A resistance-voltage (R-V) transformation system comprising one or more single-channel (SC) circuit units, an individual SC circuit unit being used for producing a voltage corresponding to a resistance of a sensing element of a structural-strain sensing network, the structural-strain sensing network being used for dynamic measurement of strain on a structure, wherein the individual SC circuit unit comprises:
- a R-V transformation circuit including three terminals used for connecting the half WB to a first resistor and a second resistor, one of the three terminals being a common node configured to connect to both the first and second resistors such that an output voltage of the half WB is obtained at the common node, wherein the second resistor is the sensing element; and
- a band-pass filter module for band-pass filtering a first signal obtained from the half-WB output voltage to thereby generate a bandlimited signal for the dynamic strain measurement, the band-pass filter module being configured such that an unwanted low-frequency voltage component induced by resistance drift of the sensing element is substantially removed from the first signal while allowing a guided-wave signal component in the first signal to substantially pass through.

2. The system of claim 1, wherein the individual SC circuit further comprises the first resistor selected to be a variable resistor having a resistance tunable for matching with the resistance of the sensing element.

3. The system of claim 1, wherein the individual SC circuit unit is arranged such that the first resistor is another sensing element, the sensing element and said another sensing element being located at the same position but on opposite sides of the structure.

4. The system of claim 1, wherein the individual SC circuit unit further comprises the first resistor selected to have a fixed resistance value.

5. The system of claim 1, wherein the first signal is obtained from the R-V transformation circuit output voltage by at least removing a direct-current (DC) bias from the R-V transformation circuit output voltage.

6. The system of claim 1, wherein the individual SC circuit unit further comprises:
- a high-pass filter for filtering the R-V transformation circuit output voltage so as to at least remove the DC bias from the R-V transformation circuit output, thereby generating a second signal as an output of the high-pass filter; and
- a wideband signal amplifier for generating the first signal by amplifying the second signal without substantially loading the high-pass filter.

7. The system of claim 6, wherein the wideband signal amplifier is a non-inverting amplifier.

8. The system of claim 1, wherein the band-pass filter module is further configured to substantially suppress a high-frequency noise located outside a frequency band of the guided-wave signal component.

9. The system of claim 1, wherein the band-pass filter module comprises one or more high-pass filters and one or more low-pass filters, all of the one or more high-pass filters and the one or more low-pass filters being cascaded in series.

10. The system of claim 9, wherein the number of the one or more high-pass filters is four and the number of the one or more low-pass filters is one, each of the four high-pass filters and the one low-pass filter being a second-order active filter.

11. The system of claim 1, wherein the band-pass filter module has a lower −3 dB cut-off frequency of 15 kHz and an upper −3 dB cut-off frequency of 500 kHz.

12. The system of claim 1, wherein the individual SC circuit unit further comprises:
- a high-gain amplification module for amplifying the bandlimited signal of the band-pass filter module, whereby the guided-wave signal component in the bandlimited signal is amplified for the dynamic strain measurement.

13. The system of claim 12, wherein the high-gain amplification module comprises a plurality of amplifiers cascaded in series.

14. The system of claim 12, wherein the high-gain amplification module is a cascade of two inverting amplifiers.

15. The system of claim 1, wherein the sensing element of the structural-strain sensing network is a nanocomposite sensing element.

16. The system of claim 1, wherein the sensing element of the structural-strain sensing network is a piezoresistive sensor.

* * * * *